April 30, 1957  W. C. PADGETT  2,790,411
MULTIPLE BAND FREQUENCY INDICATOR FOR RADIO APPARATUS
Filed Jan. 25, 1955  3 Sheets-Sheet 1
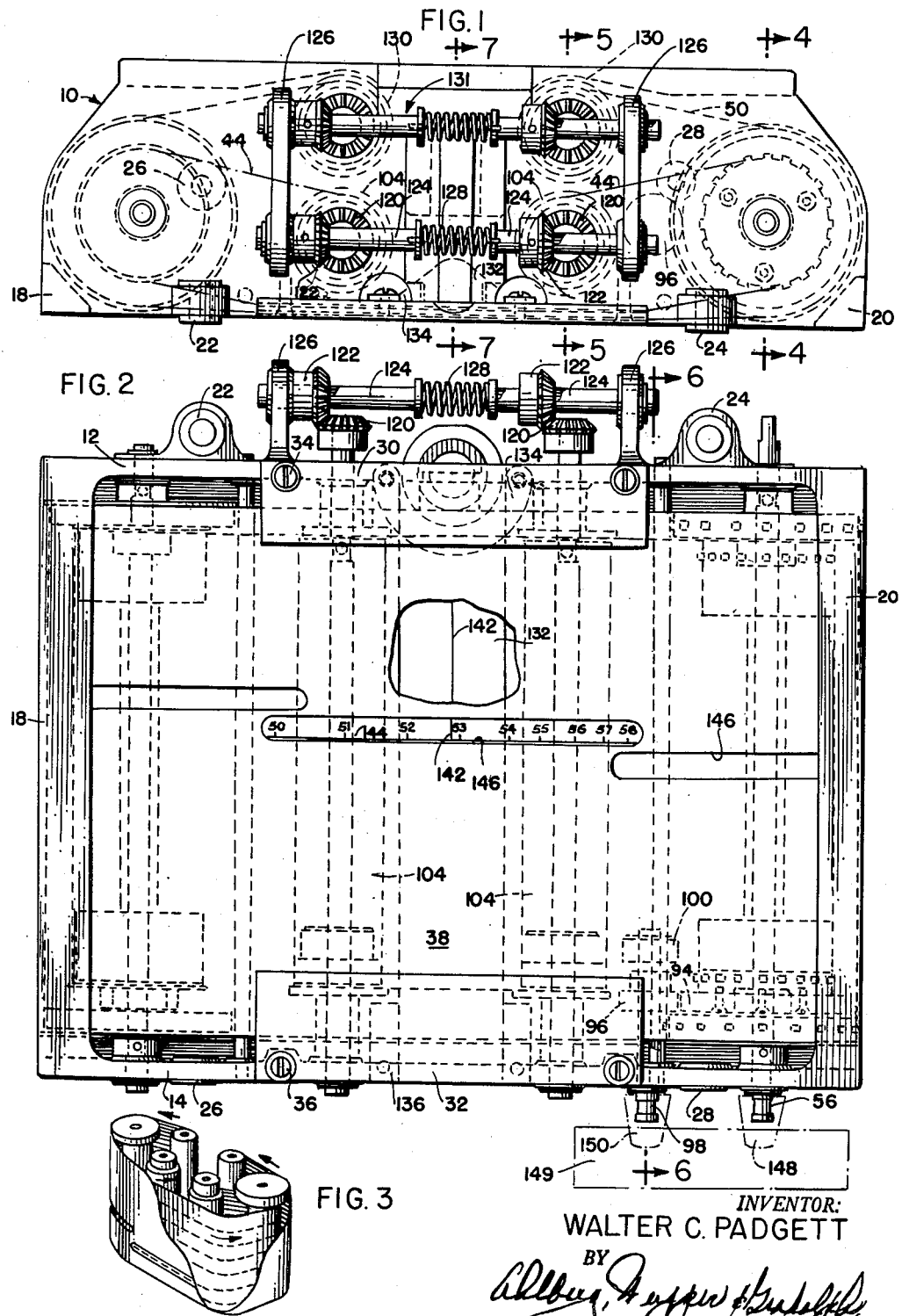
INVENTOR:
WALTER C. PADGETT
BY
ATT'YS April 30, 1957      W. C. PADGETT      2,790,411
MULTIPLE BAND FREQUENCY INDICATOR FOR RADIO APPARATUS
Filed Jan. 25, 1955      3 Sheets-Sheet 2

*INVENTOR:*
WALTER C. PADGETT
BY
ATT'YS

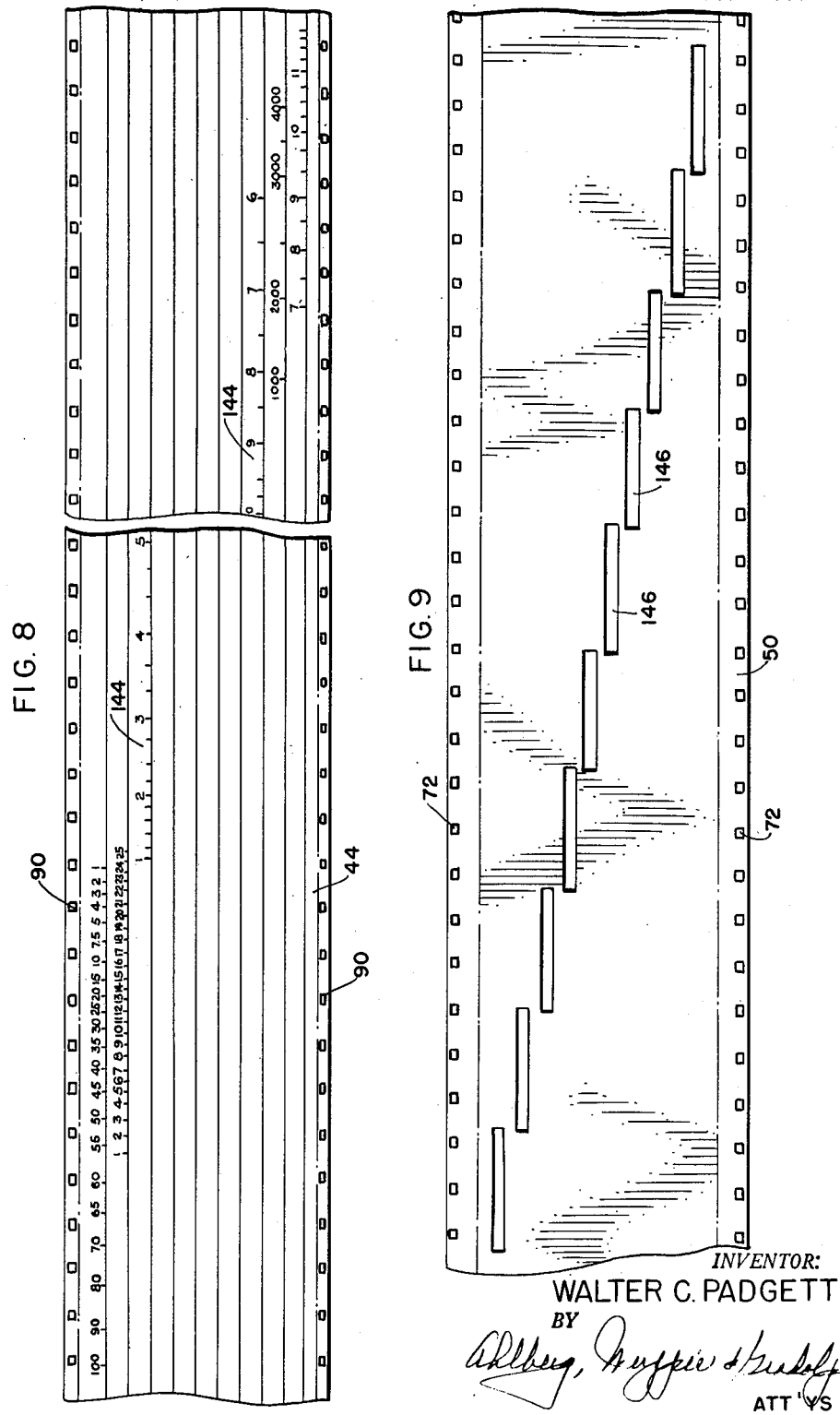

United States Patent Office 2,790,411
Patented Apr. 30, 1957

2,790,411

MULTIPLE BAND FREQUENCY INDICATOR FOR RADIO APPARATUS

Walter C. Padgett, Elmhurst, Ill., assignor to Stewart-Warner Corporation, Chicago, Ill., a corporation of Virginia Application January 25, 1955, Serial No. 484,041

6 Claims. (Cl. 116—124.1)

The present invention relates to a frequency indicator for use with multiple band radio tuners.

One object of the invention is to provide for use with a multiple band radio tuner an improved frequency indicator formed as a single compact unit capable of accommodating a large number of generally parallel frequency scales each of which may be extended to any desired length, the scales being located in any desired position in relation to each other.

Another object is to provide in the frequency indicator recited in the previous object, improved masking means which facilitates quick reading of any selected frequency scale, and at the same time provides assurance against reading the wrong scale.

A more specific object is to provide an improved multiple band frequency indicator of the above character in which a large number of frequency scales are formed on a flexible strip supported and adjusted by simplified winding means which automatically eliminates slack in the strip at all times.

Other objects and advantages will become apparent from the following description of a preferred embodiment of my invention which is illustrated in the accompanying drawings.

In the drawings, in which similar characters of reference refer to similar parts throughout the several views—

Figure 1 is a top view of a multiple band frequency indicator embodying the invention;

Fig. 2 is a front view of Fig. 1;

Fig. 3 is a simplified perspective view showing major components of the indicator and illustrating its mode of operation;

Fig. 8 is a fragmentary view of a frequency scale strip used in the indicator; and Fig. 9 is a fragmentary view of a masking strip used in the indicator.

Figure 4:
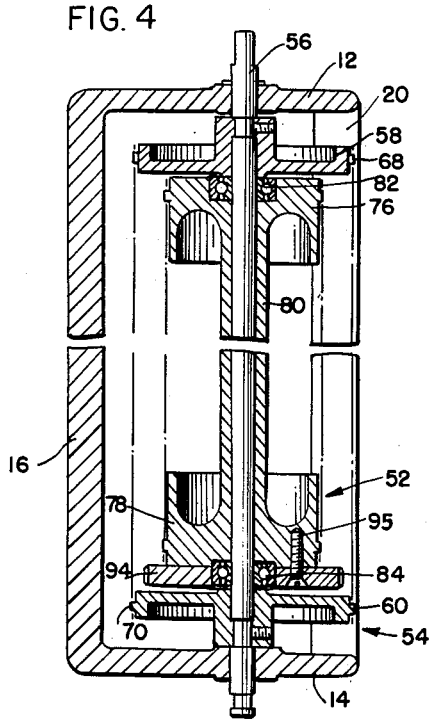
Fig. 4 is a sectional view, taken along the line 4—4 of Fig. 1.

Referring more particularly to the drawings, the illustrated embodiment of the invention comprises a support frame 10, including two generally flat horizontal leg members 12, 14 extending forwardly from the upper and lower edges of a generally flat vertical connecting member 16. The two forward corners of the upper leg member 12 are connected to the underlying corners of the lower leg member 14 by elongated connecting members 18, 20 (Fig. 2). Two horizontally spaced, upright ears 22, 24 on the forward edge of the upper leg member 12 are centrally bored for use in attaching the frame 10 to coacting support structure (not shown). Additional support for the frame may be provided through centrally bored, thickened bosses 26, 28 on the lower leg member 14. The frame 10 thus formed can be cast in one piece from an aluminum alloy or other suitable material.

Two horizontally elongated guide strips 30, 32, secured by screws 34, 36 to the forward edges of the upper and lower frame members 12, 14, extend inwardly a short distance toward each other to define between the two strips a viewing face 38 covering the central forward side of the frame 10.

Figure 5:
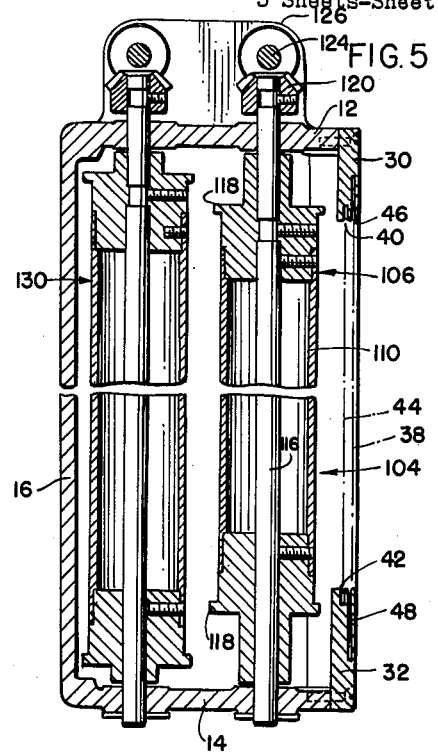
Fig. 5 is a sectional view, taken along the line 5—5 of Fig. 1.
Figure 7:
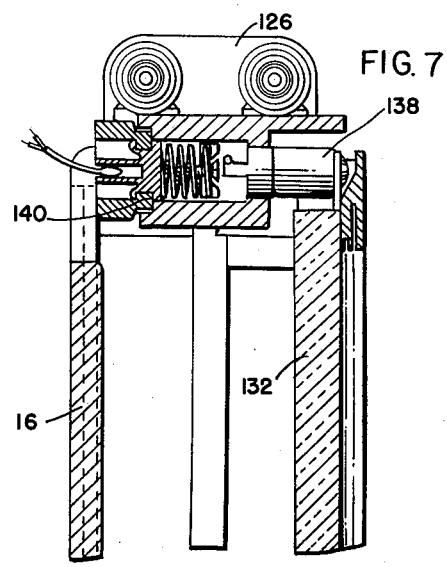
Fig. 7 is a sectional view, taken along the line 7—7 of Fig. 1.

A first pair of coplanar guide slots 40, 42 formed in the inner marginal edges of the respective guide members 30, 32, Figs. 5 and 7, extend the full length of the guide members and open toward each other to receive the opposite side edges of a flexible scale strip or film 44, Fig. 8, formed from an at least partially transparent material.

A second pair of guide slots 46, 48 formed in the inner marginal edges of the respective guide members 30, 32 in outwardly spaced relation to the slots 40, 42 are generally similar to but substantially deeper than the latter slots. The deeper slots 46, 48 receive the opposite marginal edges of a masking strip or film 50, Fig. 9, formed of a flexible opaque material. The masking strip 50 is somewhat wider than the scale strip 44.

The scale strip 44 and the masking strip 50 are fitted into the coacting slots in the guide members 30, 32 to extend horizontally across the viewing face 38 with the masking strip disposed in horizontally spaced covering relation to the scale strip, Figs. 1, 2 and 5. At opposite ends of the viewing face 38, the two strips 44, 50 are trained over two dual pulley units 52, 54, journaled at opposite ends of the frame 10 between the upper and lower leg members 12, 14.

As shown in Fig. 4, the pulley units 52, 54 at each end of the frame 10 are both mounted on a common shaft 56 parallel to the connecting frame member 16 and journaled at opposite ends in the leg members 12, 14.

The pulley unit 54 for the masking strip 50 is formed by two sprocket wheels 58, 60 fixed to the shaft 56 adjacent the inner faces of the upper and lower frame members 12, 14. The sprocket wheels 58, 60 engage the opposite marginal edges of the masking strip, which are perforated as at 72 along the entire length of the strip to receive sprockets on the wheels.

The pulley unit 52 for the scale strip 44 is formed by two circular sprocket elements 76, 78 integral with opposite ends of a centrally bored sleeve 80 journaled on the shaft 56 between the two sprocket wheels 58, 60 by antifriction bearings 82, 84, substantially smaller in diameter than the sprocket wheels 58, 60. The pulley elements 76, 78 engage the perforated longitudinal edges 90 of the scale strip 44.

Figure 6:
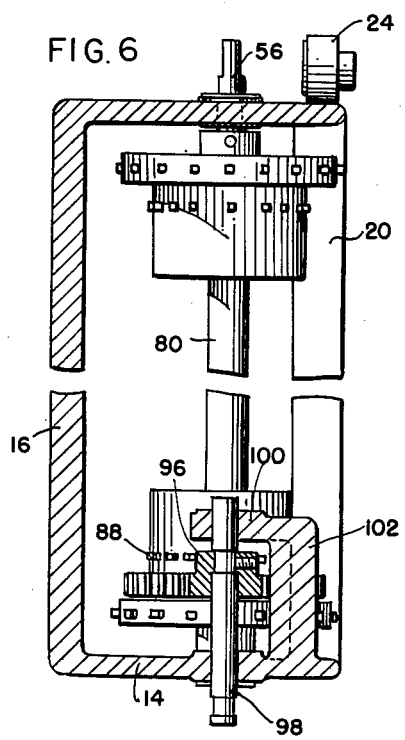
Fig. 6 is a sectional view, taken along the line 6—6 of Fig. 2.

The dual pulley units 52, 54 at opposite ends of the frame 10 are substantially identical except for the addition to the pulley unit 52 at the right end of the frame (Figs. 1 and 2) of an annular driving gear 94 attached by screws 95 to the lower end of the pulley element 78, as shown in Fig. 4. The gear 94 meshes with a driving pinion 96, Figs. 2 and 6, located at the side of the gear adjacent the central portion of the frame 10. The pinion 96 is fixed to a short driving shaft 98 extending up through the lower frame member 14 into the horizontal leg 100 of an L-shaped support 102 extending upwardly from the frame member 14.

Opposite ends of the scale strip 44, which extend from the viewing face 38 around the respective pulley units 52, are rolled onto a pair of spaced parallel rollers or reels 104 journaled between the frame members 12 and 14 rearwardly of the viewing face. As shown in Fig. 5, each reel 104 comprises a cylindrical winding drum assembly 106 fixed on a central vertical shaft 116 journaled at opposite ends in the upper and lower frame members 12 and 14. Radial flanges 118 on opposite ends of the drum assembly 106 assist in proper winding of the strip 44.

Unwinding of the scale strip 44 from either reel 104 causes rotation of the reel. This rotary movement is transmitted through a geared connection to the other reel 104, which winds up the strip as it is unwound from the first reel. The geared connection between the reels includes two bevel gears 120 connected to the upper ends of the respective reel shafts 116, which protrude above the frame member 12. The two bevel gears 120 mesh with two coacting bevel gears 122 fixed to two spaced coaxial stub shafts 124 journaled respectively in two transverse supporting ears 126 extending upwardly from the frame member 12. Adjacent ends of the two shafts 124 are connected by a helical torsion spring 128 capable of yieldably transmitting rotary movement of one shaft to the other. The two bevel gears 122 are located on the same side of the respecitve bevel gears 120 so that rotation of one reel 104 tends to rotate the other reel in the same direction.

A residual stress in the torsion spring 128 biases the two reels 104 in opposite directions to maintain proper tension on the portion of the strip between the reels. The flexibility of the torsion spring 128 allows sufficient differential turning movement between the reels 104 to compensate for different effective diameters of the two reels due to different lengths of the strip 44 being wound thereon.

Opposite ends of the flexible masking strip 50 are trained around the pulley units 54 at opposite ends of the viewing face 38 and wound onto two spaced parallel reels 130 journaled in the frame members 12, 14 just rearwardly of the respective reels 104. The construction and mounting of the reels 130 is similar to that of the reels 104 except that the reels 130 are made somewhat wider to accommodate the masking strip 50.

The reels 130 are caused to rotate in unison by geared interconnecting means 131 substantially identical to the geared interconnecting structure 120 to 128 between the scale strip reels 104. The upright ears 126 on the frame 10 extend rearwardly to provide support for the masking reel connecting means 131 in the same manner that support is provided for the geared connection between the scale strip reels 104.

An elongated vertical prism 132 is mounted by brackets 134, 136 on the forward edges of the frame members 12, 14 to extend vertically across the viewing face 38 immediately behind the guide members 30, 32. The prism 132 is formed from a plastic or other suitable translucent material. An electric lamp 138 (Fig. 7), mounted in a socket 140 on the underside of the upper frame member 12, is aligned with the upper end of the prism 132 to provide a diffused internal lighting of the prism extending along its entire length. A vertical reference line 142 centrally formed on the outer face of the prism 132 stands out distinctly against the diffused internal lighting of the prism.

As shown in Fig. 8, space is provided on the scale strip 44 for ten parallel frequency scales 144 corresponding to the frequency bands of a radio tuner used in association with the frequency indicator. The scales 144 extend along the length of the strip 44 in transversely spaced relation across the strip. Each scale 144 can be located along the length of the strip 144 at any desired position independently of the other scales.

In will be appreciated that the scale strip 44 can be extended in length and width as desired to accommodate an unlimited number of frequency scales transversely spaced along the strip and to provide unlimited space for extending the scales along the strip. The reels 104 and the frame 10 can be readily designed to accommodate a scale strip 44 of any size needed in the frequency indicator.

The masking strip or film 50 is formed from a flexible opaque material which masks off the underlying scale strip 44 except for portions of the latter strip visible through a plurality of transversely and longitudinally spaced slots 146 in the masking strip. The slots 146 may be either openings through the strip 50 or transparent portions of an unbroken strip. One slot 146, elongated along the length of the strip 50, is provided for each frequency scale 144. The ten slots 146 on the masking strip shown, Fig. 9, are spaced across the strip in transverse alignment with the respective frequency scales 144 on the strip 44. The width of each slot 146 is sufficient to expose only one frequency scale on the underlying scale strip. The length of each slot 146, Fig. 2, is approximately equal to that of the guides 30, 32 at opposite sides of the viewing face 38. The displacement of the viewing slots 146 longitudinally along the strip 50 is such that adjacent ends of consecutive slots are in approximately transverse alignment with each other with respect to the strip. If desired a narrow portion of the masking strip 50 may be made transparent for the full length of the strip to permit viewing at any time of a logging scale on the strip 44.

As shown in Fig. 2, the shaft 56 of the right-hand pulley unit 54 is connected at 148 with the control of an associated radio tuner 149 (illustrated diagrammatically in Fig. 2) to rotate the attached sprockets 58, 60 in a direction to bring the masking slot 146 corresponding to the selected frequency band 144 into a centrally located position on the viewing face 38. The selected slot 146 registers across the viewing face 38 with the corresponding frequency band scale 144. Thus coordinated with the selection of a frequency band by the tuner 149, the masking strip structure automatically designates visibly the proper frequency band scale to be read by the user. The stub shaft 98 which drives the right-hand pulley unit 52 (Fig. 2) is connected at 150 with a control of the associated radio tuner to position the frequency scale strip 44 in accordance with the adjustment of the tuner.

The diffuse internal lighting of the prism 132 provides a soft lighting of a short section of the frequency scale 144 visible through the masking strip slot 146 centered with the prism. Hence, the eye of the viewer is attracted to a short lighted length of a single scale. The frequency is read at the reference line 142 visible through the partially transparent scale strip 44. All the other scales are blocked off by the masking strip 50 to simplify reading the indicator and to eliminate confusion between the various scales.

While I have shown and described a preferred embodiment of my invention it will be apparent that variations and modifications thereof may be made without departing from the principles and scope of the invention. I therefore desire, by the following claims, to include all such variations and modifications by which substantially the results of my invention may be obtained through the use of substantially the same or equivalent means.

I claim:

1. A frequency indicator adapted for use with a multiple frequency band radio turner, comprising, in combination, a frame, means on the frame defining a viewing face, a first pair of reels journaled on the frame in spaced parallel relation to each other, rotary connecting means between said reels for transmitting rotary movement of either reel to the other reel, a flexible scale strip extending across the viewing face and rolled at opposite ends on the respective reels, the scale strip having a plurality of frequency scales thereon extending longitudinally thereof and spaced transversely with respect to the strip, a second pair of reels journaled on the frame in spaced relation to each other, rotary connecting means between the second pair of reels for transmitting rotary movement from one reel to the other, a flexible masking strip extending across the viewing face in covering relation to the portion of the scale strip extending thereacross, opposite ends of the masking strip being rolled onto the respective rollers of said second pair, the masking strip defining a plurality of viewing slots therein elongated in the same direction as the strip and spaced longitudinally and transversely thereon in transverse alignment with the respective frequency scales on the scale strip, means interconnected with the masking strip to move the latter in opposite directions, and control means interconnected with the scale strip to move the latter in opposite directions, the scale strip control being adapted for interconnection with the control member of a radio tuner.

2. A frequency indicator adapted for use with a multiple frequency band radio tuner, comprising, in combination, a support frame, means on the frame defining a viewing face, a first pair of reels journaled on the frame in spaced parallel relation to each other, a flexible scale strip extending across the viewing face and having opposite ends wound on the respective reels, rotary connecting means between the two reels for transmitting rotary movement of one reel to the other, a resilient torsion member interposed in the connecting means to bias the reels in relation to each other to maintain tension on the scale strip, the scale strip having a plurality of frequency scales thereon extending longitudinally thereof and spaced transversely with respect to the strip, means defining an elongated indicating element disposed adjacent the viewing face in transverse relation thereto, a second pair of reels journaled on the frame in generally parallel relation to each other, a flexible masking strip extending across the viewing face in overlying relation to the scale strip and rolled at opposite ends on the respective reels of said second pair, rotary connecting means between said second pair of reels for transmitting rotary movement of one reel to the other, a resilient torsion member interposed in the last mentioned connection means for biasing the second pair of reels in relation to each other to maintain a tension on the masking strip, the masking strip defining a plurality of elongated transparent slots therein longitudinally and transversely spaced therealong, means interconnected with the masking strip to move the latter in opposite directions, and means interconnected with the scale strip to move the latter in opposite directions.

3. Frequency indicating means for use with a plural frequency band radio tuner, comprising, in combination, a support frame, spaced parallel film strip guides on the frame defining a viewing face therebetween, a pair of parallel pulley units disposed adjacent opposite ends of said strip guides and journaled on the frame about axes perpendicular to the guides, a pair of parallel reels journaled on the frame inwardly of the respective pulleys, a flexible scale strip extending across the viewing face with opposite edges of the strip disposed in guided relation to the guides and trained at opposite ends over the respective pulleys onto the respective reels, rotary connecting means between the reels for transmitting rotary movement of one reel to the other, the connecting means including therein a resilient torsional coupling stressed to bias the reels relative to each other to maintain tension on the scale strip extending across the viewing face, the scale strip having a plurality of frequency band scales thereon extending longitudinally thereof and spaced transversely relative thereto, means defining an elongated translucent reference element disposed adjacent the viewing face in transverse relation thereto, lighting means at one end of said reference element, a tuner control interconnected with the scale strip independently of the reels to move the strip in either direction across the viewing face to an extent which remains continuously proportional to the movement of the tuner control for all degrees of movement of the strip, and visible frequency band designating means shiftable into registry across the viewing face with any one of the scales of said strip.

4. A frequency indicator for use with a multiple frequency band radio tuner, comprising, in combination, a support frame, means on the frame defining a viewing face, a reference element disposed adjacent said face in transverse relation thereto, two coaxial pulley units journaled on said frame in parallel relation to each other adjacent the respective ends of the viewing face, one of the pulley units at each end of the face being larger in diameter than the other unit and including generally a pair of sprocket wheels disposed at opposite ends of the other pulley unit, a first pair of reels journaled on the frame in spaced parallel relation to each other and to the pulley units, a flexible frequency scale strip extending across the viewing face and around the pulley units of smaller diameter at opposite ends of the face, opposite ends of the scale strip being wound on the respective reels, the scale strip having thereon a plurality of frequency scales extending longitudinally thereon in transversely spaced relation, control means connected with the smaller pulley unit at one end of the viewing face for imparting reverse movement to the scale strip, connecting means between the reels for transmitting rotary movement of one reel to the other so that the second reel takes up the strip as it is unreeled from the first reel, a flexible masking strip extending across the viewing face in covering relation to the scale strip and extending around the pulley units of larger diameter at opposite ends of the face, a second pair of reels journaled on the frame in spaced parallel relation to each other and to the first reels, opposite ends of the masking strip being wound onto the respective reels of the second pair, connecting means between said second pair of reels for transmitting rotary movement of one reel to the other, and means interconnected with the larger pulley unit at one end of the viewing face for moving the masking strip in accordance with the changing of frequency bands of an associated radio tuner.

5. Frequency indicating apparatus adapted for use with a multiple frequency band radio tuner, comprising, in combination, a frame, means on the frame defining a viewing face, a pair of parallel spaced reels journaled on the frame, a flexible scale strip extending across the viewing face and having opposite ends rolled onto the respective reels, the strip having a plurality of frequency band scales thereon extending longitudinally thereof in transversely spaced relation with respect to the strip, the strip having a length considerably greater than the course thereof between the reels, rotary means connecting the reels to rotate either reel in a direction to roll the strip thereon in response to turning of the other reel as an incident to unrolling of the strip therefrom, the connecting means including resilient biasing means coupled rotatably to the reels to bias the latter rotatably in relation to each other to maintain tension on the strip, tuner control means independent of the reels interconnected directly with the strip between the reels to move the strip in either direction across the viewing face to an extent which remains continuously proportional to the movement of the tuner control means for all degrees of movement of the strip across the viewing face, and movable scale reading means shiftable across the viewing face to register transversely across the strip with any selected one of the frequency band scales thereon.

6. A frequency indicator adapted for use with a multiple frequency band radio tuner, comprising, in combination, a frame, means on said frame defining a viewing face, a pair of reels journaled on said frame, a flexible scale strip extending across said viewing face and having opposite ends rolled onto said respective reels, said strip having a plurality of frequency band scales thereon extending longitudinally thereof and spaced transversely relative to the strip, said strip having a length considerably greater than the course thereof between said reels, rotary actuating means connected to said respective reels to turn either reel in a direction to roll the strip thereon as the strip is unrolled from the other reel, tuner control means connected directly to said strip independently of said reels to move the strip in either direction across said viewing face to an extent which remains continuously proportional to the movement of the tuner control for all degrees of movement of the strip, and visible frequency band designating means movable across said viewing face into registry with any one of the frequency band scales on the portion of said strip crossing the viewing face.

References Cited in the file of this patent

UNITED STATES PATENTS

| | | |
|---|---|---|
| 1,555,743 | Ballenger | Sept. 29, 1925 |
| 1,734,068 | Ziola | Nov. 5, 1929 |
| 1,787,298 | Ziola | Dec. 30, 1930 |